United States Patent
Seol et al.

(10) Patent No.: US 10,361,765 B2
(45) Date of Patent: Jul. 23, 2019

(54) APPARATUS AND METHOD FOR CONTROLLING ARRAY ANTENNA DEVICE IN COMMUNICATION SYSTEM

(71) Applicants: Samsung Electronics Co., Ltd., Gyeonggi-do (KR); Korea Advanced Institute of Science and Technology, Daejeon (KR)

(72) Inventors: Ji-Yun Seol, Gyeonggi-do (KR); Hee-Seong Yang, Seoul (KR); Joo-Hwan Chun, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 155 days.

(21) Appl. No.: 14/294,044

(22) Filed: Jun. 2, 2014

(65) Prior Publication Data
US 2014/0355467 A1 Dec. 4, 2014

(30) Foreign Application Priority Data
May 31, 2013 (KR) ........................ 10-2013-0062811

(51) Int. Cl.
| | |
|---|---|
| *H04B 7/04* | (2017.01) |
| *H04B 7/06* | (2006.01) |
| *H04W 72/04* | (2009.01) |

(52) U.S. Cl.
CPC ............. *H04B 7/0686* (2013.01); *H04B 7/04* (2013.01); *H04W 72/046* (2013.01)

(58) Field of Classification Search
CPC ...... H04B 7/04; H04B 7/0408; H04B 7/0413; H04B 7/0417; H04B 7/043; H04B 7/0452;
(Continued)

(56) References Cited

U.S. PATENT DOCUMENTS 6,600,445 B2 * 7/2003 Li ........................ H01Q 1/246
342/174
6,747,595 B2 6/2004 Hirabe
(Continued)

FOREIGN PATENT DOCUMENTS

WO WO-2010025148 A1 * 3/2010 ............ H04W 16/10
WO WO-2011083875 A1 * 7/2011 ........ H04W 72/0426

OTHER PUBLICATIONS

Zekavat; An Introduction to Direction-Of-Arrival Estimation Techniques Via Antenna Arrays; Handbook of Position Location: Theory, Practice, and Advances, IEEE, John Wiley & Sons, Inc.; Sep. 6, 2011; p. 293-297, §9.4 DOA Estimation Methods.*
(Continued)

*Primary Examiner* — Eric Nowlin

(57) ABSTRACT

One or more embodiments provide a method for controlling array antenna device in a base station (BS) in a communication system. The method includes determining whether to perform a calibration operation for BSs while operating in one of a normal mode and an interference control mode. The method also includes transiting from the one of the normal mode and the interference control mode to a calibration mode based on the determining result of whether to perform the calibration operation for the BSs. A reference antenna among antennas included in the array antenna device is used in all of the normal mode, the interference control mode, and the calibration mode.

18 Claims, 10 Drawing Sheets

(58) Field of Classification Search
CPC .... H04B 7/0617; H04B 7/068; H04B 7/0689; H04B 17/14; H04B 17/21; H04B 7/0608; H04B 7/061; H04B 7/0695; H04B 7/086; H04B 7/088; H04B 7/0897; H04W 16/28; H04W 24/02; H04L 25/0248

See application file for complete search history.

(56) References Cited

U.S. PATENT DOCUMENTS

| | | | |
|---|---|---|---|
| 7,098,847 B2* | 8/2006 | Li | H01Q 3/267 342/174 |
| 7,130,586 B2* | 10/2006 | Corbett | H01Q 1/242 455/456.1 |
| 7,239,894 B2* | 7/2007 | Corbett | H04B 7/0837 455/11.1 |
| 7,274,936 B2* | 9/2007 | Zangi | H04B 17/309 342/367 |
| 7,295,811 B2* | 11/2007 | Stern-Berkowitz | H04W 36/18 343/757 |
| 7,308,264 B2* | 12/2007 | Stern-Berkowitz | H04W 36/30 342/354 |
| 7,366,464 B2* | 4/2008 | Iacono | H04W 16/24 455/115.1 |
| 7,574,236 B1* | 8/2009 | Mansour | H04B 7/0413 455/562.1 |
| 7,627,298 B2* | 12/2009 | Taira | H04B 7/024 370/320 |
| 7,746,940 B2* | 6/2010 | Yeon | H04L 27/2634 375/260 |
| 7,764,957 B2* | 7/2010 | Stern-Berkowitz | H04W 36/18 455/422.1 |
| 8,085,721 B2* | 12/2011 | Ylitalo | H04B 7/0408 342/457 |
| 8,320,919 B2* | 11/2012 | Zangi | H04B 17/309 370/328 |
| 8,335,529 B2* | 12/2012 | Taira | H04B 7/024 370/320 |
| 8,619,927 B2* | 12/2013 | Kludt | H04B 7/0413 375/345 |
| 8,768,393 B2* | 7/2014 | Shirani-Mehr | H04W 72/048 370/252 |
| 8,873,514 B2* | 10/2014 | Kim | H04W 72/082 370/332 |
| 8,948,327 B2* | 2/2015 | Kludt | H04B 7/0413 375/345 |
| 8,976,761 B2* | 3/2015 | Stager | H04W 24/02 370/334 |
| 9,036,539 B2* | 5/2015 | Kim | H04W 56/0015 370/324 |
| 9,184,892 B2* | 11/2015 | Novak | H04W 24/02 |
| 9,271,176 B2* | 2/2016 | Chen | H04W 24/10 |
| 9,271,185 B2* | 2/2016 | Abdelmonem | H04L 5/0026 |
| 9,331,764 B2* | 5/2016 | Shin | H04B 7/0617 |
| 9,560,615 B2* | 1/2017 | Kim | H04W 56/0015 |
| 9,799,954 B2* | 10/2017 | Preradovic | H01Q 3/24 |
| 2002/0039906 A1* | 4/2002 | Rudolf | H04B 1/7077 455/502 |
| 2004/0090938 A1* | 5/2004 | Hsu | H04B 7/086 370/335 |
| 2004/0242273 A1* | 12/2004 | Corbett | H04B 7/0837 455/562.1 |
| 2004/0242274 A1* | 12/2004 | Corbett | H01Q 1/242 455/562.1 |
| 2005/0070266 A1* | 3/2005 | Senarath | H04W 16/02 455/422.1 |
| 2005/0176385 A1* | 8/2005 | Stern-Berkowitz | H04W 36/18 455/101 |
| 2005/0176469 A1* | 8/2005 | Stern-Berkowitz | H04W 36/30 455/562.1 |
| 2005/0181733 A1* | 8/2005 | Zangi | H04B 17/309 455/67.11 |
| 2005/0239506 A1* | 10/2005 | Li | H01Q 3/267 455/561 |
| 2005/0285803 A1* | 12/2005 | Iacono | H04W 16/24 343/702 |
| 2007/0066305 A1* | 3/2007 | Deguchi | H04L 27/2601 455/436 |
| 2007/0202921 A1* | 8/2007 | Stern-Berkowitz | H04W 36/18 455/562.1 |
| 2007/0243878 A1* | 10/2007 | Taira | H04B 7/024 455/450 |
| 2008/0002627 A1* | 1/2008 | Cha | H01Q 3/2611 370/334 |
| 2008/0020715 A1* | 1/2008 | Zangi | H04B 17/309 455/73 |
| 2009/0296650 A1* | 12/2009 | Venturino | H04W 16/28 370/330 |
| 2010/0048220 A1* | 2/2010 | Taira | H04B 7/024 455/450 |
| 2010/0195527 A1* | 8/2010 | Gorokhov | H04B 7/0417 370/252 |
| 2010/0202308 A1* | 8/2010 | Gorokhov | H04B 7/0417 370/252 |
| 2011/0151912 A1* | 6/2011 | Taira | H04B 7/024 455/509 |
| 2012/0182958 A1* | 7/2012 | Pelletier | H04L 5/001 370/329 |
| 2013/0005376 A1* | 1/2013 | Shirani-Mehr | H04W 72/048 455/509 |
| 2013/0083681 A1* | 4/2013 | Ebrahimi Tazeh Mahalleh | H04L 5/0057 370/252 |
| 2013/0115985 A1* | 5/2013 | Davydov | H04B 7/024 455/501 |
| 2013/0142148 A1* | 6/2013 | Malte | H04W 72/046 370/329 |
| 2013/0322559 A1* | 12/2013 | Kludt | H04B 7/0413 375/267 |
| 2013/0331136 A1* | 12/2013 | Yang | H04B 7/024 455/501 |
| 2014/0078976 A1* | 3/2014 | Novak | H04W 24/02 370/329 |
| 2014/0086077 A1* | 3/2014 | Safavi | H04W 24/02 370/252 |
| 2014/0185719 A1* | 7/2014 | Kludt | H04B 7/0413 375/345 |
| 2014/0269964 A1* | 9/2014 | Du | H04B 7/0452 375/267 |
| 2014/0274094 A1* | 9/2014 | Abdelmonem | H04L 5/0026 455/452.1 |
| 2015/0281993 A1* | 10/2015 | Chen | H04W 24/10 370/338 |
| 2015/0304976 A1* | 10/2015 | Kim | H04W 56/0015 370/350 |
| 2016/0087704 A1* | 3/2016 | Guey | H04B 7/0617 370/336 |
| 2016/0087705 A1* | 3/2016 | Guey | H04B 7/0617 370/336 |
| 2016/0099761 A1* | 4/2016 | Chen | H04B 7/0408 370/336 |
| 2016/0135061 A1* | 5/2016 | Abdelmonem | H04L 5/0026 455/422.1 |
| 2016/0294451 A1* | 10/2016 | Jung | H04B 17/20 |
| 2017/0338875 A1* | 11/2017 | Berglund | H04B 7/0617 |

OTHER PUBLICATIONS

Muhamed, Rias; Direction of Arrival Estimation Using Antenna Arrays; Master's Thesis; Virginia Polytechnic Institute and State University, Jan. 1996, p. 77, §4.3.*

(56) References Cited

OTHER PUBLICATIONS

Hyeon, et al., "Novel Automatic Calibration Technique for Smart Antenna Systems", Digital Signal Processing, vol. 19, No. 1, 2009, pp. 14-21.
Nishimori, et al., "Automatic Calibration Method of Adaptive Array Considering Antenna Characteristics for FDD Systems", Proceedings of ISAP2000, Fukuoka, Japan, 2000, 4 pages.
Gesbert, et al., "Shifting the MIMO Paradigm", IEEE Signal Processing Magazine, vol. 24, No. 5, Sep. 2007, pp. 36-46.

\* cited by examiner

APPARATUS AND METHOD FOR CONTROLLING ARRAY ANTENNA DEVICE IN COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on May 31, 2013 assigned Serial No. 10-2013-0062811, the entire disclosure of which is incorporated herein by reference.

TECHNICAL FIELD

The present disclosure relates to an apparatus and method for controlling an array antenna device in a communication system. More particularly, the present disclosure relates to an apparatus and method for controlling an array antenna device to operate various operation modes in a communication system.

BACKGROUND

FIG. 1 schematically illustrates an example of structure of array antenna device in a conventional communication system.

Referring to FIG. 1, it will be assumed that the communication system is a frequency division duplexing (FDD) communication system which uses a code division multiple access (CDMA) scheme.

Referring to FIG. 1, the array antenna device includes N+1 antennas, i.e., an additional antenna 110 and N array antennas, i.e., an array antenna #1 120-1, an array antenna #2 120-2, ..., an array antenna # n 120-n , ..., an array antenna # N 120-N, N+1 circulators, i.e., a circulator #0 130-0, a circulator #1 130-1, ..., a circulator # n 130-n, ..., a circulator # N 130-N, N+1 radio frequency (RF) chains, i.e., N+1 RF transmit chains, i.e., a RF transmit chain #0 140-0, a RF transmit chain #1 140-1, ..., a RF transmit chain #n 140-n, ..., a RF transmit chain #N 140-N, N+1 RF receive chains, i.e., a RF receive chain #0 150-0, a RF receive chain #1 150-1, ..., a RF receive chain #n, a RF receive chain #N 150-N, and a calibration processor 160.

The additional antenna 110 is an antenna which is used for performing a calibration operation on the array antenna device in a an FDD scheme based communication system which uses the CDMA scheme, and the array antenna device performs the calibration operation using a phenomenon in which signals transmitted from antennas are coupled among the antennas if a calibration signal is transmitted in the array antenna device.

As illustrated in FIG. 1, a RF chain, i.e., a RF transmit chain and a RF receive chain are connected to each of antennas included in the array antenna device, so the array antenna device becomes a fully digital system. Here, it will be assumed that a transmit frequency which the array antenna device uses is "$f_{tx}$", and a receive frequency which the array antenna device uses is "$f_{rx}$".

It will be assumed that a phase difference which occurs when a calibration signal is transmitted/received between the additional antenna 110 and each of the array antenna #1 120-1, the array antenna #2 120-2, ..., the array antenna # n 120-n , ..., the array antenna # N 120-N has been previously measured. Here, a undesired complex gain is not almost changed since locations of the additional antenna 110, the array antenna #1 120-1, the array antenna #2 120-2, ..., the array antenna # n 120-n, ..., the array antenna # N 120-N are fixed, the additional antenna 110, the array antenna #1 120-1, the array antenna #2 120-2, ..., the array antenna # n 120-n, ..., the array antenna # N 120-N are passive, or a wired environment neighboring the array antenna # n 120-n, ..., the array antenna # N 120-N are fixed, the additional antenna 110, the array antenna #1 120-1, the array antenna #2 120-2, ..., the array antenna # n 120-n, ..., the array antenna # N 120-N are passive, so the phase difference may be previously measured.

A transmit path calibration operation of the array antenna device in FIG. 1 is performed through processes (a1) to (c1), and a detailed description will be followed.

(a1) The calibration processor 160 generates a calibration signal, and outputs the generated calibration signal to the RF transmit chain #1 140-1, ..., the RF transmit chain #n 140-n, ..., the RF transmit chain #N 140-N. Each of the RF transmit chain #1 140-1, ..., the RF transmit chain #n 140-n, ..., the RF transmit chain #N 140-N modulates the calibration signal output from the calibration processor 160 corresponding to the transmit frequency $f_{tx}$ to transmit the modulated signal.

(b1) The RF receive chain #0 150-0 receives a signal in which signals transmitted from the RF transmit chain #1 140-1, ..., the RF transmit chain #n 140-n, ..., the RF transmit chain #N 140-N are coupled, and the calibration processor 160 separates a data signal which is linearly combined with a calibration signal transmitted from each of the array antenna #1 120-1, the array antenna #2 120-2, ..., the array antenna # n 120-n, ..., the array antenna # N 120-N as well as a data signal into a signal per antenna path.

(c1) The calibration processor 160 calculates a calibration factor for each transmit path from the separated calibration signal per antenna path, and a detailed description will be followed.

A signal received in the RF receive chain #0 150-0 in the (b1) process may be expressed as Equation (1).

$$y(t) = \sum_n M_{c_n}(t) e^{j(\phi_c^{rx} + \phi_{cn} + \phi_n^{tx})} + \sum_{n=1}^{M} \sum_{m=1}^{M} s_{n,m}(t) e^{j(\phi_c^{rx} + \phi_{cn} + \phi_n^{tx})} z_c(t) \quad \text{Equation (1)}$$

In Equation (1), $c_n(t)$ denotes a calibration signal transmitted from the nth array antenna, $z_c(t)$ denotes an additive white Gaussian noise (AWGN) in a calibration antenna path, $\phi_c^{rx}$ denotes a receive phase characteristic of the additional array antenna, $\phi_n^{tx}$ denotes a transmit phase characteristic of the nth array antenna, $\phi_{cn}$ denotes phase delay between the additional array antenna and the nth array antenna, and $s_{n,m}(t)$ denotes the mth data signal from the nth array antenna.

A phase difference between the jth array antenna and the kth array antenna in the (b1) process may be expressed as Equation (2).

$$\rho_{kj}^{tx} = \rho_k^{tx} / \rho_j^{tx} = \frac{1}{T} \int_T y(t) c_k^*(t) dt \bigg/ \frac{1}{T} \int_T y(t) c_j^*(t) dt = \quad \text{Equation (2)}$$

$$\frac{e^{j(\phi_c^{rx} + \phi_{ck} + \phi_k^{tx})}}{e^{j(\phi_c^{rx} + \phi_{cj} + \phi_j^{tx})}} = e^{j(\phi_k^{tx} - \phi_j^{tx})}$$

In Equation (2), T denotes a period of a test signal, and this is why $e^{j(\Phi_{ck} - \Phi_{cj})}$ may be previously compensated.

So, a transmit calibration factor may be detected using the phase $\rho_{kj}^{tx}$ between the jth array antenna and the kth array antenna.

Further, a receive path calibration operation of an array antenna device in FIG. 1 is performed through processes (a2) to (c2), and a detailed description will be followed.

(a2) The RF transmit chain #0 140-0 modulates the calibration signal output from the calibration processor 160 corresponding to a receive frequency $f_{rx}$ to transmit the modulated signal.

(b2) The RF receive chain #1 150-1 to the RF receive chain #N 150-N receive the calibration signal transmitted from the RF transmit chain #0 140-0 in the (a2) process in a coupling form, and the calibration processor 160 separates the calibration signal which is combined with digital signals received in the RF receive chain #1 150-1 to the RF receive chain #N 150-N.

(c2) The calibration processor 160 calculates a calibration factor for each receive path from the separated calibration signal, and a detailed description will be followed.

A signal which is received through the nth array antenna in the (b2) process may be expressed as Equation (3).

$$r_n(t) = c(t)e^{j(\phi_c^{tx}+\phi_{cn}+\phi_n^{rx})} + \sum_{m=1}^{M} s_{n,m}(t)e^{j\phi_n^{rx}} + z_n(t) \quad \text{Equation (3)}$$

In Equation (3), $c_n(t)$ denotes a test signal of a RF transmit chain which is connected to the nth array antenna, $\phi_c^{tx}$ denotes a transmit phase characteristic of the RF transmit chain which is connected to the nth array antenna, $\phi_c^{rx}$ denotes a receive phase characteristic of the nth array antenna, $\phi_{cn}$ denotes phase delay between the additional array antenna and the nth array antenna, $s_{n,m}(t)$ denotes the mth data signal from the nth array antenna, and $z_n(t)$ denotes an AWGN from the nth array antenna path.

A phase difference between the jth array antenna and the kth array antenna in the (b2) process may be expressed as Equation (4).

$$\rho_{kj}^{rx} = \rho_k^{rx}/\rho_j^{rx} = \frac{1}{T}\int_T r_j(t)c^*(t)dt \Big/ \frac{1}{T}\int_T r_k(t)c^*(t)dt = \frac{e^{j(\phi_c^{tx}+\phi_{ck}+\phi_k^{rx})}}{e^{j(\phi_c^{tx}+\phi_{cj}+\phi_j^{rx})}} = e^{j(\phi_k^{rx}-\phi_j^{rx})} \quad \text{Equation (4)}$$

In Equation (4), T denotes a period of a test signal, and this is why $e^{j(\phi_{ck}-\phi_{cj})}$ may be previously compensated.

An example of structure of array antenna device in a conventional communication system has been described with reference to FIG. 1, and another example of structure of array antenna device in a conventional communication system will be described with reference to FIG. 2.

FIG. 2 schematically illustrates another example of structure of array antenna device in a conventional communication system.

Referring to FIG. 2, the array antenna device performs a calibration operation using a signal which is acquired by internally circulating a calibration signal using a coupler. So, the array antenna device in FIG. 2 uses a relatively complex RF network.

The array antenna device includes N array antennas, i.e., an array antenna #1 210-1, an array antenna #2 210-2, ..., an array antenna #N 210-N, ..., an array antenna #N 120-N, N circulators, i.e., a circulator #1 220-1, ..., a circulator #2 220-2, ..., a circulator #N 220-N, N directional couplers (DCs), i.e., a DC #1 230-1, a DC #2 230-2, ..., a DC #N 230-N, a frequency converter (FC) 240, a plurality of switches, i.e., a SW#1 250-1, a SW#2 250-2, a SW#3 250-3, ..., N RF transmit chains, i.e., a RF transmit chain #1 260-1, a RF transmit chain #2 260-2, ..., a RF transmit chain #N 260-N, N RF receive chains, i.e., a RF receive chain #1 270-1, a RF receive chain #2 270-2, ..., a RF receive chain #N 270-N, and an adaptive & calibration processor 280.

Further, f1 denotes a transmitting operation frequency, f2 denotes a receiving operation frequency, Q denotes a undesired complex gain which occurs by the FC 240, $R_i \exp(j\theta_i)$ denotes a undesired complex gain which occurs in the ith receiver, i.e., the ith RF receive chain, and $T_i \exp(j\Delta_i)$ denotes a undesired complex gain which occurs in the ith transmitter, i.e., the ith RF transmit chain.

A transmit path calibration operation of the array antenna device in FIG. 2 is performed through processes (a1) to (c1), and a detailed description will be followed.

(a1) A signal which is transmitted through each of the RF transmit chain #1 260-1, the RF transmit chain #2 260-2, ..., the RF transmit chain #N 260-N is coupled to each of the DC #1 230-1, the DC #2 230-2, ..., the DC #N 230-N, and the coupled signal is transferred to the SW1 250-1.

(b1) The SW1 250-1 transfers the signal which is transferred from each of the DC #1 230-1, the DC #2 230-2, ..., the DC #N 230-N to the FC 240. The FC 240 converts a transmit operating frequency of the signal which is transferred from each of the DC #1 230-1, the DC #2 230-2, ..., the DC #N 230-N to a receive operating frequency, and transfers the converted signal to the RF receive chain #1 270-1.

(c1) The array antenna device may acquire a gain as Equation (5) through the operations.

$$R_1 \exp(j\theta_1) Q T_i \exp(j\Delta_i) \text{ for } i=1,\ldots,N \quad \text{Equation (5)}$$

(d1) A transmit calibration factor may be acquired as Equation (6) using the gain which is acquired in the (c1) process.

$$H_i = \frac{R_1 \exp(j\theta_1) Q T_i \exp(j\Delta_i)}{R_1 \exp(j\theta_1) Q T_1 \exp(j\Delta_1)} = \frac{T_i \exp(j\Delta_i)}{T_1 \exp(j\Delta_1)} \quad \text{Equation (6)}$$

for $i=1,\ldots,N$

Further, a receive path calibration operation of an array antenna device in FIG. 2 is performed through processes (a2) to (c2), and a detailed description will be followed.

(a2) The signal transmitted from the RF transmit chain #1 260-1 is coupled by the DC#1 230-1, and the coupled signal is transferred to the SW 1 250-1. The SW 1 250-1 transfers the signal which is transferred from the DC#1 230-1 to the FC 240. The FC 240 frequency converts the signal output from the SW1 250-1.

(b2) The signal which is frequency converted in the FC 240 is transferred to the SW2 250-2, and the SW2 250-2 transfers the frequency converted signal to the RF receive chain #1 270-1, the RF receive chain #2 270-2, ..., the RF receive chain #N 270-N.

(c2) The array antenna device may acquire a gain as Equation (7) through the operations.

$$R_i \exp(j\theta_i) Q T_1 \exp(j\Delta_1) \text{ for } i=1,\ldots,N \quad \text{Equation (7)}$$

(d2) A receive calibration factor may be acquired as Equation (8) using the gain which is acquired in the (c2) process.

$$P_i = \frac{R_i \exp(j\theta_i) Q T_1 \exp(j\Delta_1)}{R_1 \exp(j\theta_1) Q T_1 \exp(j\Delta_1)} = \frac{R_i \exp(j\theta_i)}{R_1 \exp(j\theta_1)} \quad \text{Equation (8)}$$

for $i=1,\ldots,N$

In the array antenna device in FIG. 1, since an antenna which is additionally equipped for a calibration operation of the array antenna device, i.e., an additional antenna, may be for only the calibration operation, the additional antenna does not help to enhance a direct communication performance such as data rate, and the like, so the additional antenna is a redundancy in view of communication performance enhancement. The array antenna device in FIG. 1 considers a fully digital system in which a transmitting/receiving (TR) module equips with a RF chain, so it may be difficult that the calibration operation in FIG. 1 is applied to a sub-array based array antenna device.

Further, the array antenna device in FIG. 2 uses a RF network with relatively complex structure for calibration.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for controlling an array antenna device in a communication system.

Another aspect of the present disclosure provides an apparatus and method for controlling an array antenna device thereby operating various operation modes in a communication system.

Another aspect of the present disclosure is to provide an apparatus and method for controlling an array antenna device thereby simultaneously performing data communication and an on-line calibration operation without impacting on the data communication in a communication system.

Another aspect of the present disclosure provides an apparatus and method for controlling an array antenna device thereby supporting a sub-array based structure and performing a calibration operation in a communication system.

In accordance with an aspect of the present disclosure, one or more embodiments provide a method for controlling array antenna device in a base station (BS) in a communication system. The method includes determining whether to perform a calibration operation for BSs while operating in one of a normal mode and an interference control mode. The method also includes transiting from the one of the normal mode and the interference control mode to a calibration mode based on the determining result of whether to perform the calibration operation for the BSs. A reference antenna among antennas included in the array antenna device is used in all of the normal mode, the interference control mode, and the calibration mode.

In accordance with another aspect of the present disclosure, one or more embodiments provide a base station (BS) in a communication system. The BS includes a controller configured to determine whether to perform a calibration operation for BSs while operating in one of a normal mode and an interference control mode. The controller is also configured to transit from the one of the normal mode and the interference control mode to a calibration mode based on the determining result of whether to perform the calibration operation for the BSs. A reference antenna among antennas included in the array antenna device is used in all of the normal mode, the interference control mode, and the calibration mode.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
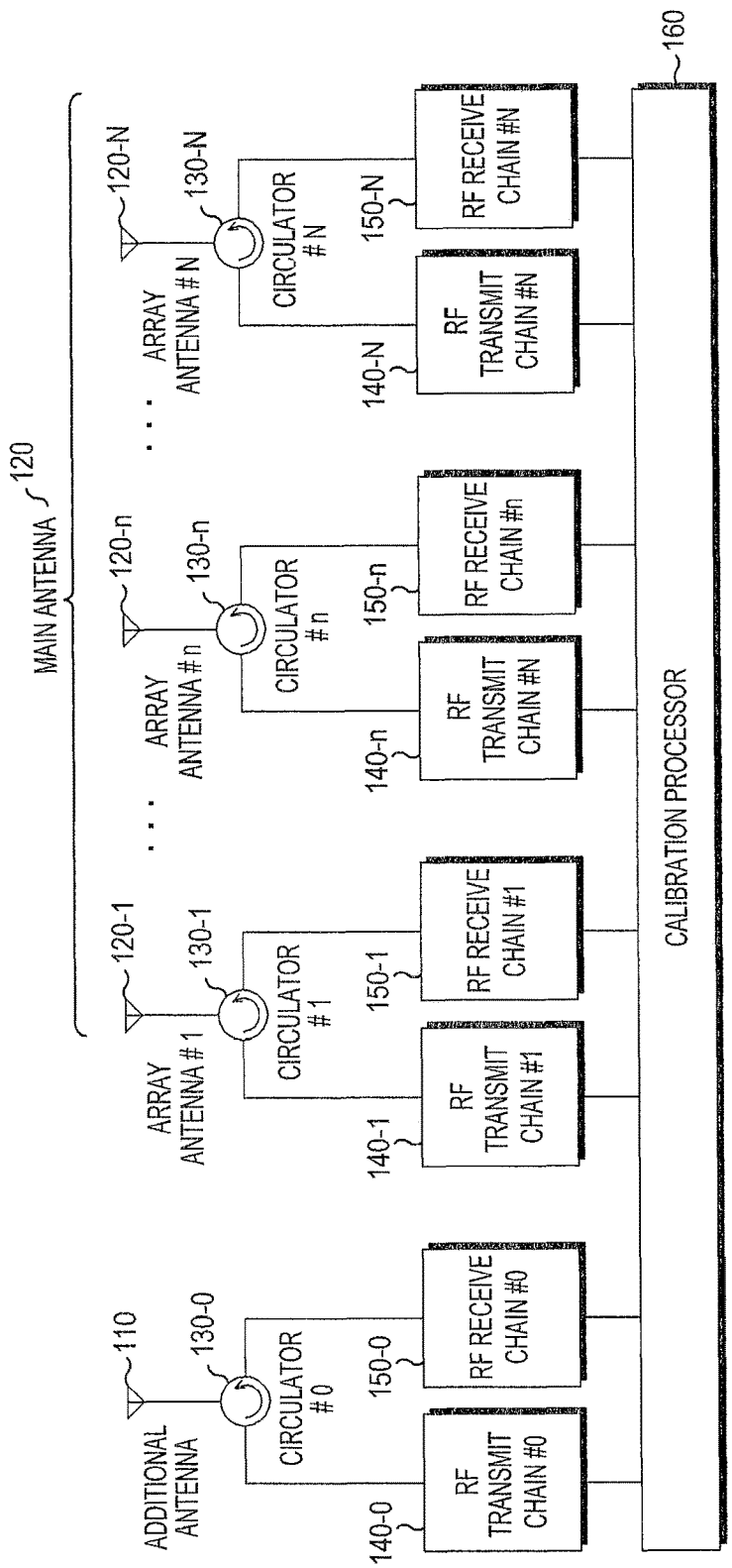
FIG. 1 schematically illustrates an example of structure of array antenna device in a conventional communication system.
Figure 2:
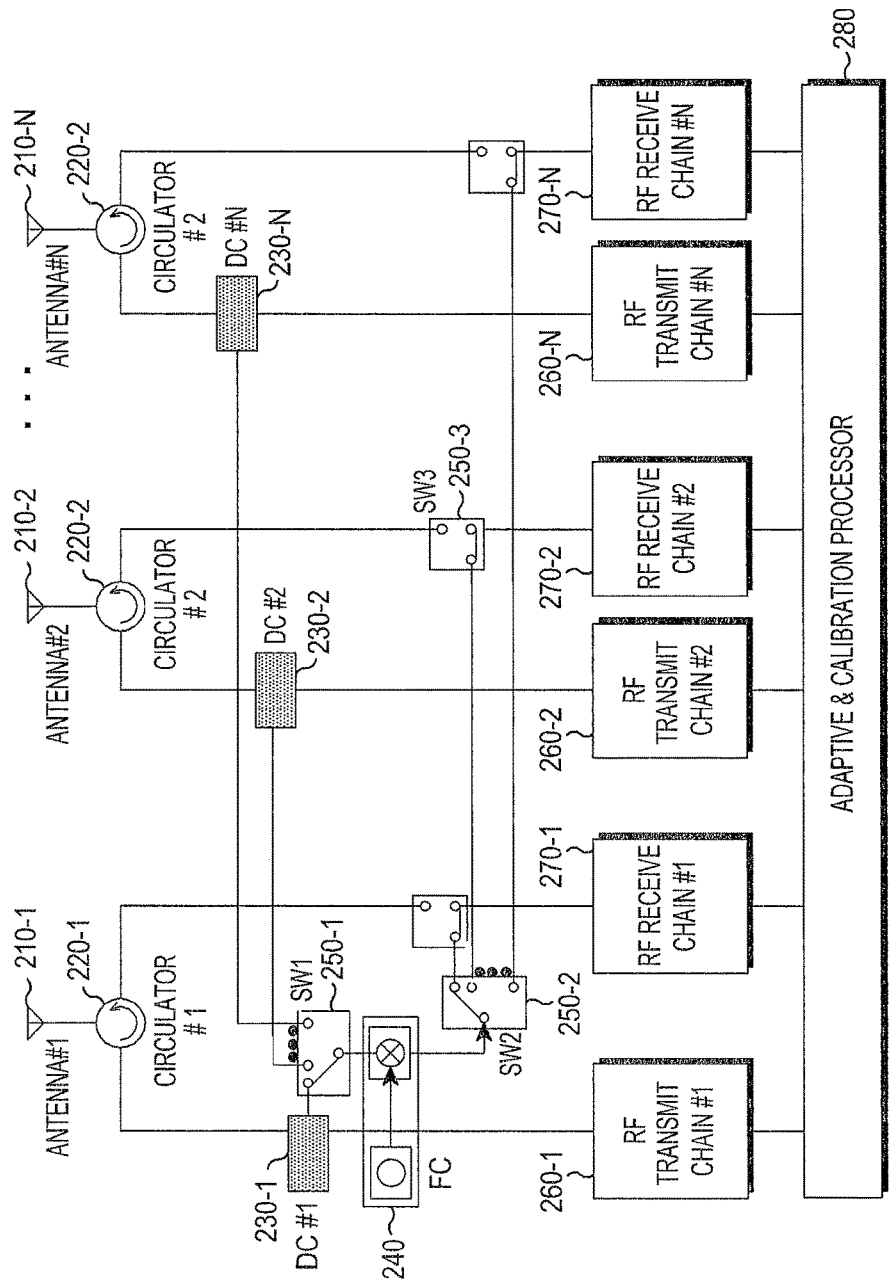
FIG. 2 schematically illustrates another example of structure of array antenna device in a conventional communication system.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. The following description with reference to the accompanying drawings is provided to assist in a comprehensive understanding of various embodiments of the present disclosure as defined by the claims and their equivalents. It includes various specific details to assist in that understanding but these are to be regarded as merely examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes an apparatus and method for controlling an array antenna device in a communication system.

An embodiment of the present disclosure proposes an apparatus and method for controlling an array antenna device thereby operating various operation modes in a communication system.

An embodiment of the present disclosure proposes an apparatus and method for controlling an array antenna device thereby simultaneously performing a data communication and an on-line calibration operation which does not impact on the data communication.

An embodiment of the present disclosure proposes an apparatus and method for controlling an array antenna device thereby supporting a sub-array based structure and performing a calibration operation.

A method and apparatus proposed in various embodiments of the present disclosure may be applied to various communication systems such as a long term evolution (LTE) system, an LTE-advanced (LTE-A) system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile internet protocol (Mobile IP) system, and/or the like.

An example of structure of array antenna device in a communication system according to an embodiment of the present disclosure will be described with reference to FIG. 3.

Figure 3:
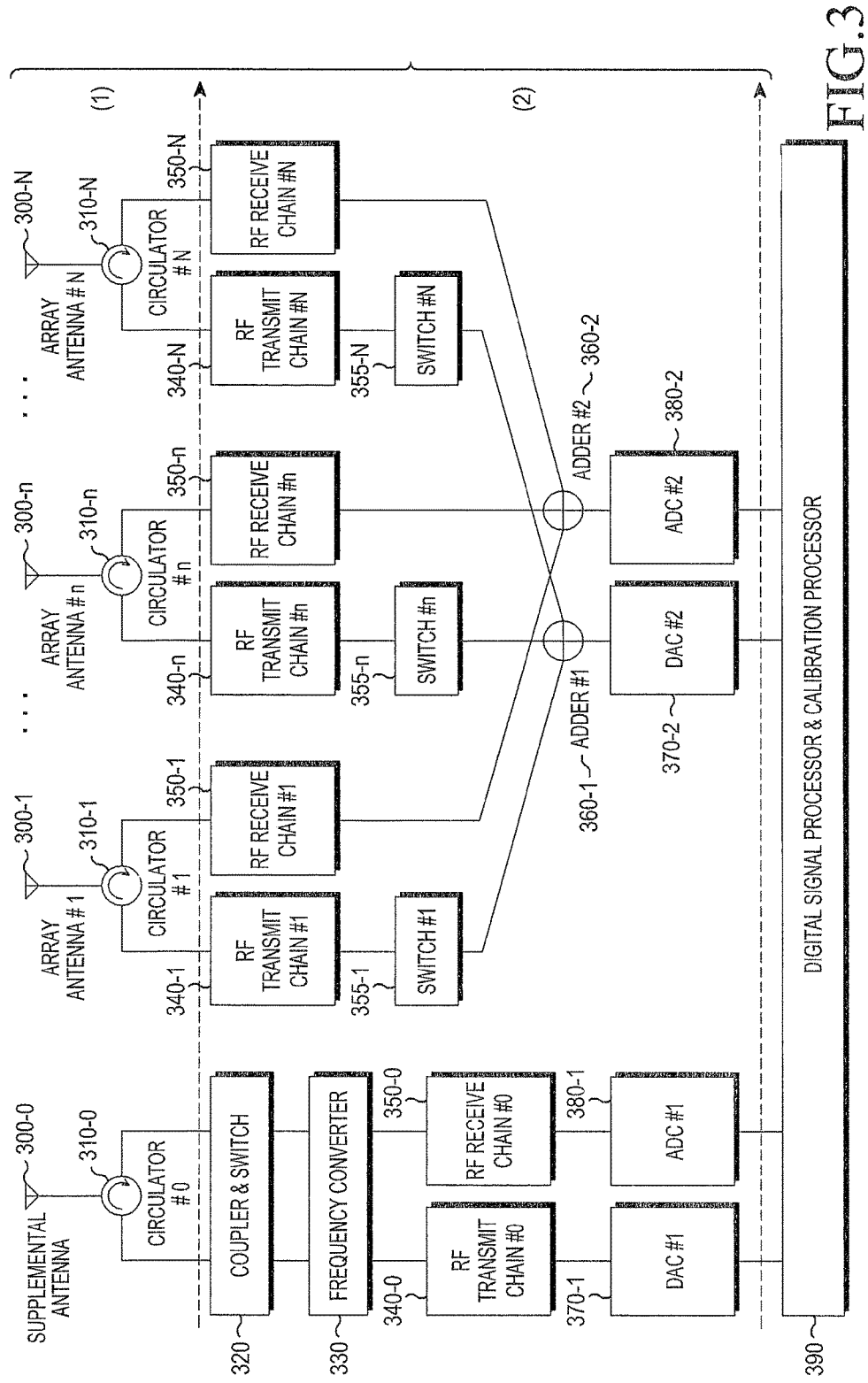
FIG. 3 schematically illustrates an example of structure of array antenna device in a communication system according to an embodiment of the present disclosure.

FIG. 3 schematically illustrates an example of structure of array antenna device in a communication system according to an embodiment of the present disclosure.

Referring to FIG. 3, the array antenna device is a sub-array based array antenna device. That is, the array antenna device in FIG. 3 may be applied to a transmitter/receiver which includes a main antenna which has one or a plurality of sub-arrays which is configured by combining a transmitting/receiving (TR) module for a plurality of antenna elements with one radio frequency (RF) chain, and one or a plurality of reference antennas. The reference antenna may perform a role as a reference antenna for a calibration operation.

Referring to FIG. 3, the array antenna device includes N+1 antennas, i.e., a supplemental antenna 300-0 and N array antennas, i.e., an array antenna #1 300-1, an array antenna #2 300-2, ..., an array antenna # n 300-n, ..., an array antenna # N 300-N, N+1 circulators, i.e., a circulator #0 310-0, a circulator #1 310-1, ..., a circulator # n 310-n, ..., a circulator # N 310-N, a coupler & switch 320, a frequency converter 330, N+1 RF transmit chains, i.e., a RF transmit chain #0 340-0, a RF transmit chain #1 340-1, ..., a RF transmit chain #n 340-n, ..., a RF transmit chain #N 340-N, N+1 RF receive chains, i.e., a RF receive chain #0 350-0, a RF receive chain #1 350-1, ..., a RF receive chain #n 350-n, ..., a RF receive chain #N 350-N, N switches, i.e., a switch #1 355-1, ..., a switch #n 355-n, ..., a switch #N 355-N, two adders, i.e., an adder #1 360-1 and an adder #2 360-2, two digital to analog converters (DACs), i.e., a DAC #1 370-1 and a DAC #2 370-2, two analog to digital converters (ADCs), i.e., an ADC #1 380-1 and an ADC #2 380-2, and a digital signal processor & calibration processor 390.

While the N+1 antennas, i.e., the supplemental antenna 300-0 and the N array antennas, i.e., the array antenna #1 300-1, the array antenna #2 300-2, ..., the array antenna # n 300-n, ..., the array antenna # N 300-N, the N+1 circulators, i.e., the circulator #0 310-0, the circulator #1 310-1, ..., the circulator # n 310-n, ..., the circulator # N 310-N, the coupler & switch 320, the frequency converter 330, the N+1 RF transmit chains, i.e., the RF transmit chain #0 340-0, the RF transmit chain #1 340-1, ..., the RF transmit chain #n 340-n, ..., the RF transmit chain #N 340-N, the N+1 RF receive chains, i.e., the RF receive chain #0 350-0, the RF receive chain #1 350-1, ..., the RF receive chain #n 350-n, ..., the RF receive chain #N 350-N, the N switches, i.e., the switch #1 355-1, ..., the switch #n 355-n, ..., the switch #N 355-N, the two adders, i.e., the adder #1 360-1 and the adder #2 360-2, the two DACs, i.e., the DAC #1 370-1 and the DAC #2 370-2, the two ADCs, i.e., the ADC #1 380-1 and the ADC #2 380-2, and the digital signal processor & calibration processor 390 are described as separate processors, it is to be understood that this is merely for convenience of description. In other words, two or more of the N+1 antennas, i.e., the supplemental antenna 300-0 and the N array antennas, i.e., the array antenna #1 300-1, the array antenna #2 300-2, ..., the array antenna # n 300-n, ..., the array antenna # N 300-N, the N+1 circulators, i.e., the circulator #0 310-0, the circulator #1 310-1, ..., the circulator # n 310-n, ..., the circulator # N 310-N, the coupler & switch 320, the frequency converter 330, the N+1 RF transmit chains, i.e., the RF transmit chain #0 340-0, the RF transmit chain #1 340-1, ..., the RF transmit chain #n 340-n, ..., the RF transmit chain #N 340-N, the N+1 RF receive chains, i.e., the RF receive chain #0 350-0, the RF receive chain #1 350-1, ..., the RF receive chain #n 350-n, ..., the RF receive chain #N 350-N, the N switches, i.e., the switch #1 355-1, ..., the switch #n 355-n, ..., the switch #N 355-N, the two adders, i.e., the adder #1 360-1 and the adder #2 360-2, the two DACs, i.e., the DAC #1 370-1 and the DAC #2 370-2, the two ADCs, i.e., the ADC #1 380-1 and the ADC #2 380-2, and the digital signal processor & calibration processor 390 may be incorporated into a single processor.

An example of structure of array antenna device in a communication system according to an embodiment of the present disclosure has been described with reference to FIG. 3, and another example of structure of array antenna device in a communication system according to an embodiment of the present disclosure will be described with reference to FIG. 4.

Figure 4:
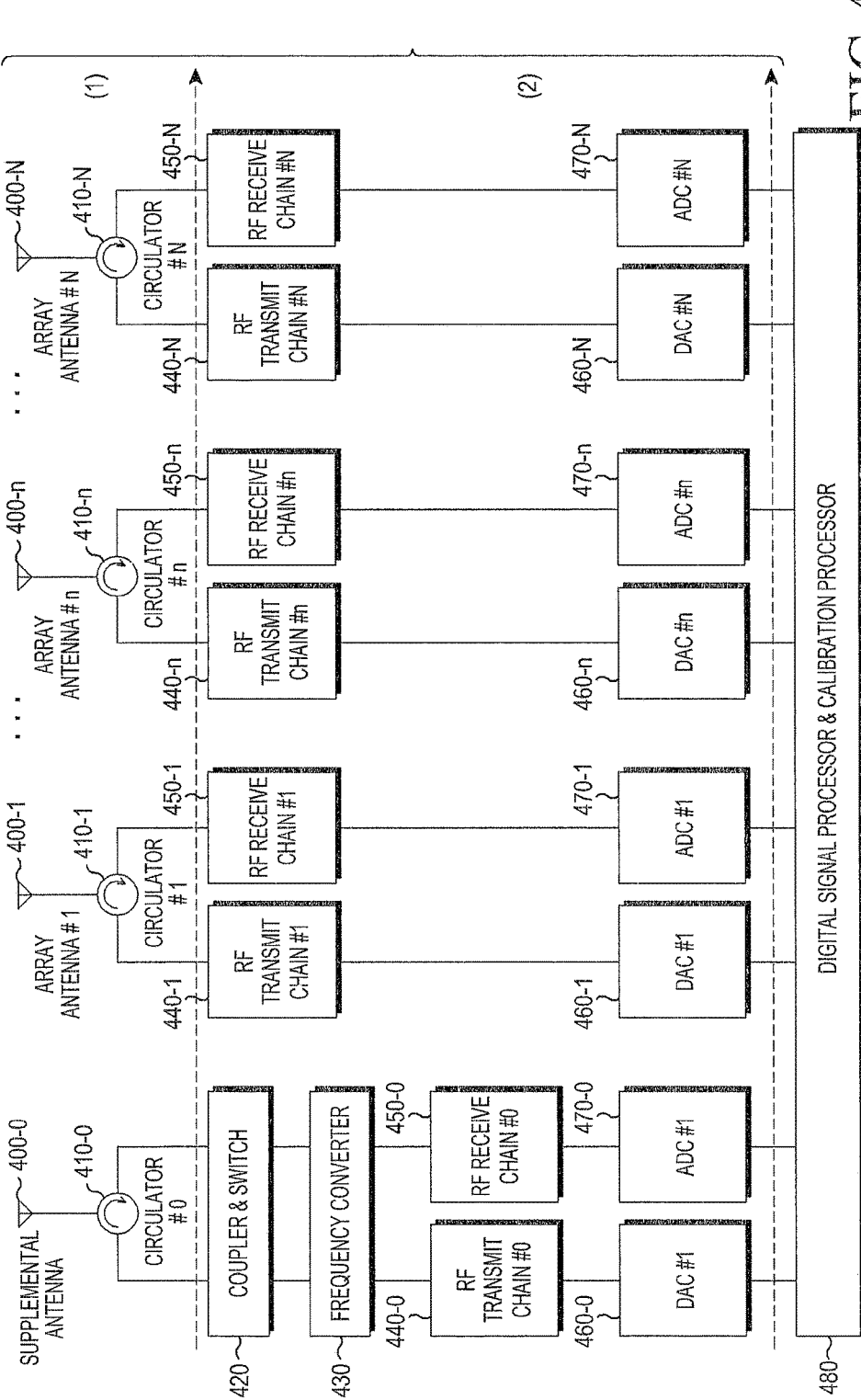
FIG. 4 schematically illustrates another example of structure of array antenna device in a communication system according to an embodiment of the present disclosure.

FIG. 4 schematically illustrates another example of structure of array antenna device in a communication system according to an embodiment of the present disclosure.

Referring to FIG. 4, the array antenna device may be applied to any array not a sub-array based array in FIG. 3.

The array antenna device includes N+1 antennas, i.e., a supplemental antenna 400-0, N array antennas, i.e., an array antenna #1 400-1, ..., an array antenna #n 400-n, ..., an array antenna #N 400-N, N+1 circulators, i.e., a circulator #0 410-0, a circulator #1 410-1, ..., a circulator # n 410-n, ..., a circulator # N 410-N, a coupler & switch 420, a frequency down converter 430, N+1 RF transmit chains, i.e., a RF transmit chain #0 440-0, a RF transmit chain #1 440-1, ..., a RF transmit chain #n 440-n, ..., a RF transmit chain # N 440-N, N+1 RF receive chains, i.e., a RF receive chain #0 450-0, a RF receive chain #1 450-1, ..., a RF receive chain #n 450-n, ..., a RF receive chain #N 450-N, N+1 DACs, i.e., a DAC #0 460-0, a DAC #1 460-1, ..., a DAC #n 460-n, ..., a DAC #N 460-N, N+1 ADCs, i.e., an ADC #0 470-0, an ADC #1 470-1, ..., an ADC #n 470-n, ..., an ADC #N 470-N, and a digital signal processor & calibration processor 480.

While the N+1 antennas, i.e., the supplemental antenna 400-0, the N array antennas, i.e., the array antenna #1 400-1, ..., the array antenna #n 400-n, ..., the array antenna #N 400-N, the N+1 circulators, i.e., the circulator #0 410-0, the circulator #1 410-1, ..., the circulator # n 410-n, ..., the circulator # N 410-N, the coupler & switch 420, the frequency down converter 430, the N+1 RF transmit chains, i.e., the RF transmit chain #0 440-0, the RF transmit chain #1 440-1, ..., the RF transmit chain #n 440-n, ..., the RF transmit chain # N 440-N, the N+1 RF receive chains, i.e., the RF receive chain #0 450-0, the RF receive chain #1 450-1, ..., the RF receive chain #n 450-n, ..., the RF receive chain #N 450-N, the N+1 DACs, i.e., the DAC #0 460-0, the DAC #1 460-1, ..., the DAC #n 460-n, ..., the DAC #N 460-N, the N+1 ADCs, i.e., the ADC #0 470-0, the ADC #1 470-1, ..., the ADC #n 470-n, ..., the ADC #N 470-N, and the digital signal processor & calibration processor 480 are described as separate processors, it is to be understood that this is merely for convenience of description. In other words, two or more of the N+1 antennas, i.e., the supplemental antenna 400-0, the N array antennas, i.e., the array antenna #1 400-1, ..., the array antenna #n 400-n, ..., the array antenna #N 400-N, the N+1 circulators, i.e., the circulator #0 410-0, the circulator #1 410-1, ..., the circulator # n 410-n, ..., the circulator # N 410-N, the coupler & switch 420, the frequency down converter 430, the N+1 RF transmit chains, i.e., the RF transmit chain #0 440-0, the RF transmit chain #1 440-1, ..., the RF transmit chain #n 440-n, ..., the RF transmit chain # N 440-N, the N+1 RE receive chains, i.e., the RF receive chain #0 450-0, the RE receive chain #1 450-1, ..., the RE receive chain #n 450-n, ..., the RE receive chain #N 450-N, the N+1 DACs, i.e., the DAC #0 460-0, the DAC #1 460-1, ..., the DAC #n 460-n, ..., the DAC #N 460-N, the N+1 ADCs, i.e., the ADC #0 470-0, the ADC #1 470-1, ..., the ADC #n 470-n, ..., the ADC #N 470-N, and the digital signal processor & calibration processor 480 may be incorporated into a single processor.

Another example of structure of array antenna device in a communication system according to an embodiment of the present disclosure has been described with reference to FIG. 4, and a calibration signal transmit/receive path for transmit path calibration and a calibration signal transmit/receive path for receive path calibration will be described with reference to FIG. 5.

Figure 5:
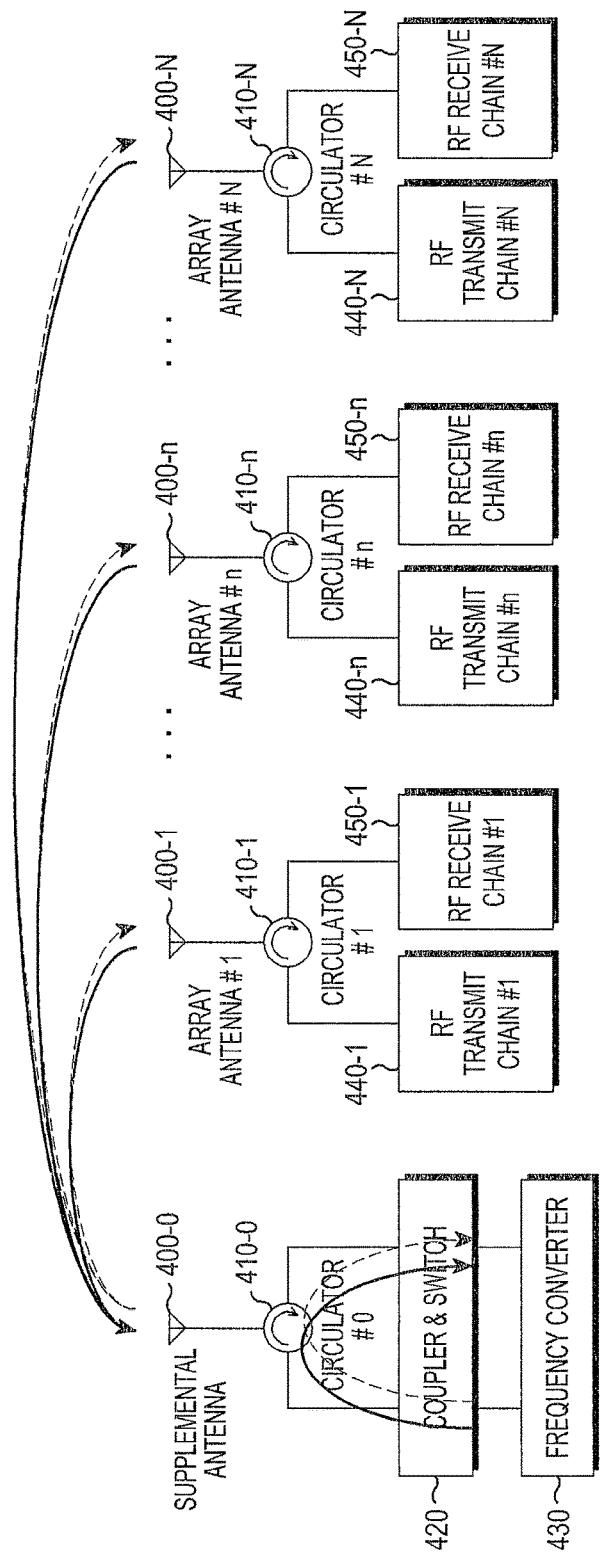
FIG. 5 schematically illustrates a calibration signal transmit/receive path for transmit path calibration and a calibration signal transmit/receive path for receive path calibration in a communication system according to an embodiment of the present disclosure.

FIG. 5 schematically illustrates a calibration signal transmit/receive path for transmit path calibration and a calibration signal transmit/receive path for receive path calibration in a communication system according to an embodiment of the present disclosure.

Referring to FIG. 5, it will be noted that a calibration signal transmit/receive path for a transmit path calibration and a calibration signal transmit/receive path for a receive path calibration is for an array antenna device in FIG. 4.

A calibration signal transmit/receive path for transmit path calibration and a calibration signal transmit/receive path for receive path calibration in a communication system according to an embodiment of the present disclosure has been described with reference to FIG. 5, and a frame structure in a communication system according to an embodiment of the present disclosure will be described with reference to FIG. 6.

Figure 6:
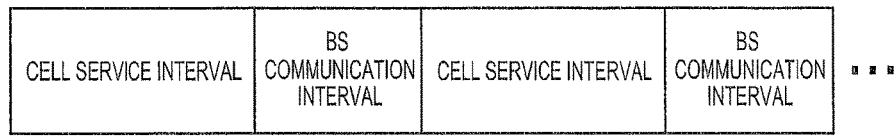
FIG. 6 schematically illustrates a frame structure in a communication system according to an embodiment of the present disclosure.

FIG. 6 schematically illustrates a frame structure in a communication system according to an embodiment of the present disclosure.

Referring to FIG. 6, one frame includes a cell service interval and a base station (BS) communication interval.

The BS communication interval is an interval in which at least two BSs which provide a service for one mobile station (MS) exchange information if the communication system supports a BS cooperative communication in which the at least two BSs provide the service for the one MS. The cell service interval is an interval which is used for supporting a communication service for an MS which is located at a related cell.

Firstly, an embodiment of the present disclosure basically considers a use of a frequency division duplexing (FDD) scheme, so a TR module for a transmit path and a TR module for a receive path do not share a phase shifter and a power amplifier.

An array antenna device proposed in an embodiment of the present disclosure may be applied to a communication system which uses a time division duplexing (TDD) scheme as well as a communication system which uses an FDD scheme. If an array antenna device proposed in an embodiment of the present disclosure is applied to a communication system which uses the TDD scheme, a TR module included in an array antenna device in each of FIG. 3 to FIG. 4 may share a phase shifter and a power amplifier.

In an array antenna device in each of FIG. 3 to FIG. 4, for an array antenna, a DAC is included in a related transmit path, i.e., a related RF transmit chain, and an ADC is included in a related receive path, i.e., a related RF receive chain.

Further, in the array antenna device in each of FIG. 3 to FIG. 4, for a reference antenna, a DAC is included in a related transmit path, i.e., a related RF transmit chain, an ADC is included in a related receive path, i.e., a related RF receive chain, and a coupler & switch and a frequency converter are included in a related RF chain.

An embodiment of the present disclosure proposes the array antenna device in each of FIG. 3 to FIG. 4 by considering the following assumptions, and a detailed description will be followed.

In order to deal with data traffic which increases in a next generation communication system which uses a high frequency band and a beam, a cell may have a structure that a plurality of BSs perform a cooperative communication at one cell, or may form a relatively small cell structure such as a nano cell, a femto cell, and the like. In this embodiment, interference control among BSs or interference control between a BS and an MS will become important.

Data communication that uses a beam and array calibration for maintenance of this can be achieved by adding a minimum device to a conventional communication system and properly operating the conventional communication system to which the minimum device is added. So, an embodiment of the present disclosure proposes a reference antenna which performs a multi-role, and an antenna structure based on an operation of a multi-mode communication and operating method thereof.

A detailed description of an operation of an array antenna device proposed in an embodiment of the present disclosure will be followed.

In an embodiment of the present disclosure, an array antenna device uses an FDD scheme, however, it will be understood by those of ordinary skill in the art that the array antenna device may use a TDD scheme as well as the FDD scheme.

An array antenna device proposed in an embodiment of the present disclosure considers a sub-array system and an array antenna system which uses a fully digital system along with the sub-array system as well as the fully digital system, and includes a reference antenna to which a frequency converter and a coupler & switch are additionally connected and a normal antenna which has a sub-array form or a general array form. The frequency converter and the coupler & switch may operate only if a calibration operation is performed, and may not operate if a data communication is performed.

The reference antenna performs a multi-role for operating a multi-mode, and a detailed description will be followed. For example, the multi-mode includes a normal mode, an interference control mode, and a calibration mode.

In FIGS. 3 to 4, an array antenna device in an embodiment of the present disclosure considers a use of an FDD scheme, so a transmit path is different from a receive path. A frequency which is used in the transmit path, i.e., a transmit frequency is $f_{tx}$, and a frequency which is used in the receive path, i.e., a receive frequency is $f_{rx}$.

In FIGS. 3 to 4, RF transmit chains, i.e., a RF transmit chain #1 to a RF transmit chain #N, and RF receive chains, i.e., a RF receive chain #1 to a RF receive chain #N denote a TR module for a normal antenna, and a RF transmit chain #0 and a RF receive chain #0 denote a TR module for a reference antenna.

In FIG. 3, switches which are connected to each of RF transmit chains, i.e., a RF transmit chain #1 to a RF transmit chain #N are options which are equipped for separating a signal which is combined with other signal due to a sub-array structure on a transmit path calibration. In FIG. 3, an array antenna device includes one reference antenna and one sub-array, however, it will be understood by those of ordinary skill in the art that the array antenna device may include a plurality of reference antennas and a plurality of sub-arrays.

Prior to a description of a calibration operation proposed in an embodiment of the present disclosure, it will be assumed that devices corresponding to (1) in FIGS. 3 to 4 are passive devices, and an error factor is previously calibrated according to a mutual coupling which occurs due to the passive devices and a cable. It will be assumed that devices corresponding to (2) in FIGS. 3 to 4 are active devices, a calibration operation by the active devices is considered in a calibration operation of the array antenna device.

FIG. 5 illustrates signal transmission in a situation that a transmit path calibration and a receive path calibration are performed. In FIG. 5, if a calibration signal for transmit calibration is transmitted, a signal which is transmitted in a path corresponding to a RF transmit chain connected to a reference antenna is received in a RF receive chain through a frequency converter and a coupler & switch, and a signal which is transmitted in a path connected to RF transmit chains is received in a RF receive chain connected to the reference antenna in a coupling form among normal antennas through the frequency converter.

As illustrated in FIG. 3, in a situation that a normal antenna is composed of a sub-array, if an array antenna device does not equip with an additional switch other than a RF transmit chain #1 to a RF transmit chain #N as options, a signal which is received through a RF receive chain connected to a reference antenna could be transmitted by performing a phase shifter toggling for signal separation, and a detailed description will be followed.

A transmit calibration signal separating operation in a situation that an array antenna device performs a calibration operation in a communication system according to an embodiment of the present disclosure will be described with reference to FIG. 7A.

Figure 7A:
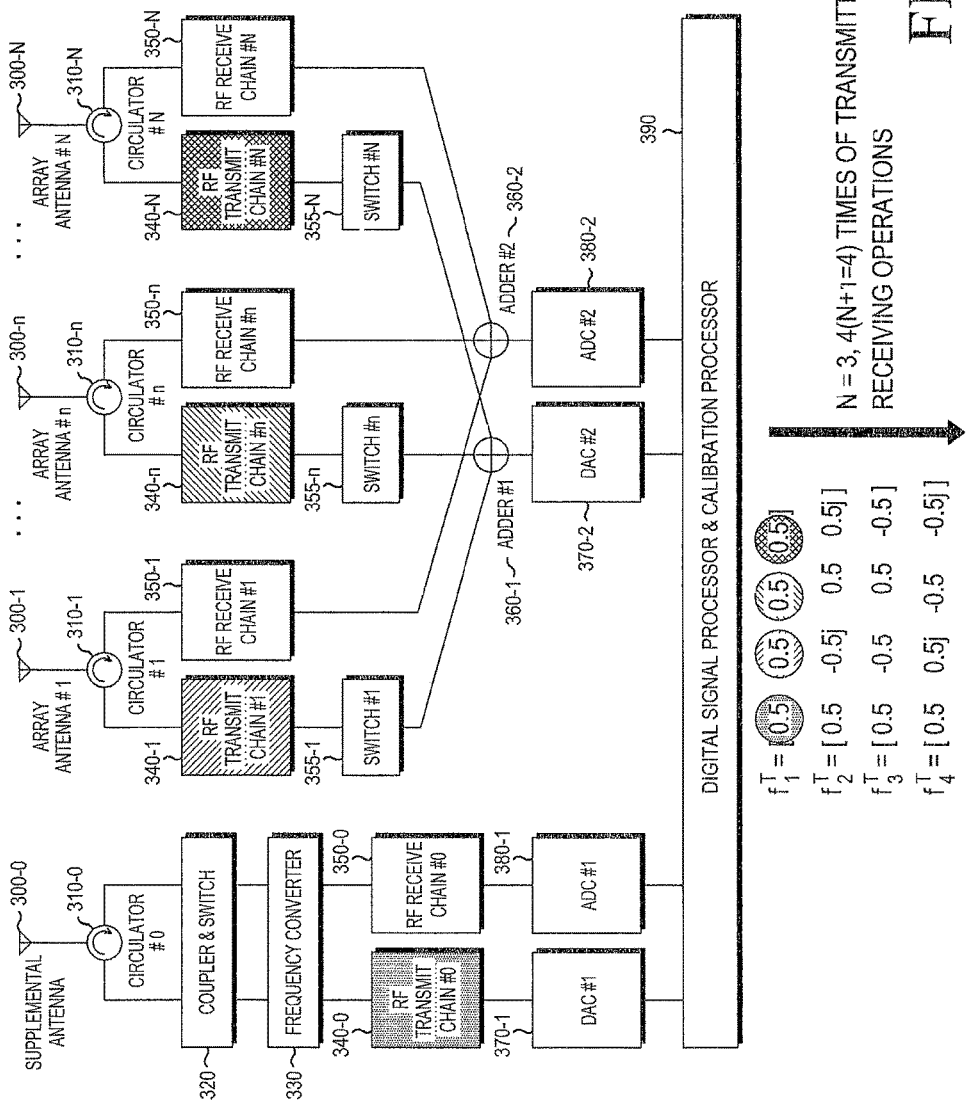
FIG. 7A schematically illustrates a transmit calibration signal separating operation in a situation that an array antenna device performs a calibration operation in a communication system according to an embodiment of the present disclosure.

FIG. 7A schematically illustrates a transmit calibration signal separating operation in a situation that an array antenna device performs a calibration operation in a communication system according to an embodiment of the present disclosure.

Referring to FIG. 7A, it will be assumed that a transmit calibration signal separating operation is a transmit calibration signal separating operation in a situation that an array antenna device in FIG. 3 is used.

If the number of antenna elements included in a sub-array of a main antenna is 3 (N=3) and the number of reference antennas is 1, there can be a need for 4(N+1=4) times of calibration signal transmissions for separating a calibration signal, a RF transmit chain #0 and a RF transmit chain #1 to a RF transmit chain #3 could toggle a phase shifter as Equation (9) whenever transmitting a calibration signal.

$$f_1^T = [0.5\ 0.5\ 0.5\ 0.5]$$

$$f_2^T = [0.5\ -0.5j\ -0.5\ 0.5j]$$

$$f_3^T = [0.5\ -0.5\ 0.5\ -0.5]$$

$$f_4^T = [0.5\ 0.5j\ -0.5\ -0.5j] \quad \text{Equation (9)}$$

As a result, a signal transmitted in the RF transmit chain #0, i.e., a RF transmit chain which is connected to a reference antenna is frequency converted corresponding to an operating frequency of a receiver, and the frequency converted signal is received in the RF receive chain #0, i.e., a RF receive chain which is connected to the reference antenna through a coupler & switch.

Calibration signals which the RF transmit chain #1 to the RF transmit chain #3 radiate are received in a coupling form, this coupled signal is frequency converted, and the frequency converted signal is received in the RF receive chain #0. This calibration signal transmitting/receiving operation is performed 4(N+1=4) times, the calibration signal transmitting/receiving operation separates a signal by toggling a phase shifter of each of the RF transmit chain #0, and the RF transmit chain #1 to the RF transmit chain #3 corresponding to a discrete Fourier transform (DFT) weight whenever transmitting/receiving a calibration signal.

So, a finally acquired signal may be expressed as Equation (10).

$$y_{tc} = F_{N+1}^T \text{diag}\{\beta_c, \beta_1, \beta_2, \ldots, \beta_N\} s \quad \text{Equation (10)}$$

In Equation (10), $\beta_i = T_i \exp(j\Delta_i) Q R_c \exp(j\theta_c)$ for i=c, 1, ..., N, $T_i \exp(j\Delta_i)$ denotes a undesired complex gain which is resulted in by the ith transmitter, $R_c \exp(j\theta_c)$ denotes a undesired complex gain which is resulted in by the RF receive chain #0, Q denotes a undesired complex gain which is resulted in by a frequency converter, $F_{N+1} = [f_1\ f_2\ \ldots\ f_N]$ denotes a DFT matrix, and s denotes a signal which is previously known.

The signal in FIG. 10 is used for acquiring $\beta_i$ for i=c, 1, ..., N by a simple equation deployment, a transmit calibration factor $H_i$ for $i = 1, \ldots, N$ may be acquired from this, and may be expressed as Equation (11).

$$H_i = \frac{T_i \exp(j\Delta_i) Q R_c \exp(j\theta_c)}{T_c \exp(j\Delta_c) Q R_c \exp(j\theta_c)} = \frac{T_i \exp(j\Delta_i)}{T_c \exp(j\Delta_c)} \quad \text{Equation (11)}$$

for $i = 1, \ldots, N$

A transmit calibration signal separating operation in a situation that an array antenna device performs a calibration operation in a communication system according to an embodiment of the present disclosure has been described with reference to FIG. 7A, and a receive calibration signal separating operation in a situation that an array antenna device performs a calibration operation in a communication system according to an embodiment of the present disclosure will be described with reference to FIG. 7B.

Figure 7B:
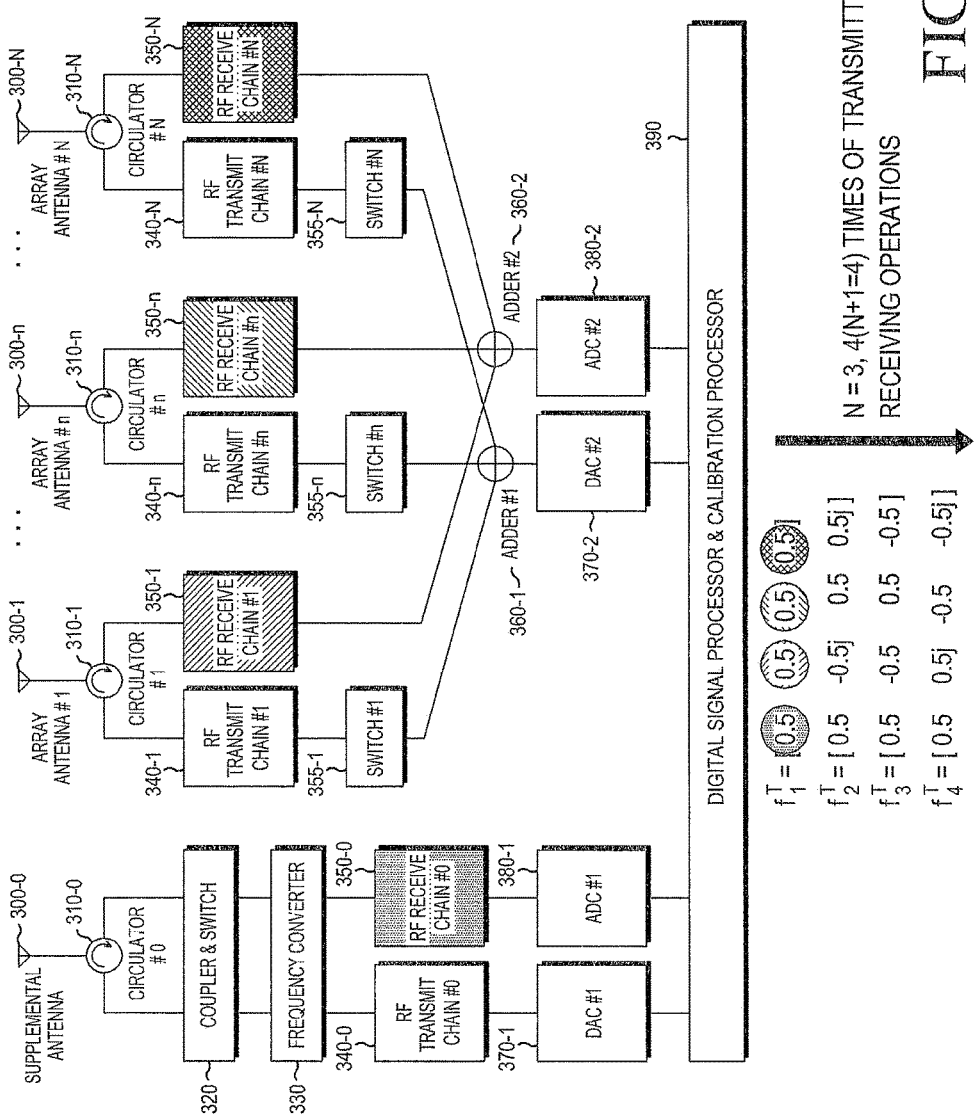
FIG. 7B schematically illustrates a receive calibration signal separating operation in a situation that an array antenna device performs a calibration operation in a communication system according to an embodiment of the present disclosure.

FIG. 7B schematically illustrates a receive calibration signal separating operation in a situation that an array antenna device performs a calibration operation in a communication system according to an embodiment of the present disclosure.

Referring to FIG. 7B, it will be assumed that a receive calibration signal separating operation is a receive calibration signal separating operation in a situation that an array antenna device in FIG. 3 is used.

A key of the receive calibration signal separating operation is that a RF transmit chain #0 and a RF transmit chain #1 to a RF transmit chain #3 toggle a phase shifter in 4 times of calibration signal transmitting/receiving operation and each receiving operation, and a detailed description will be followed.

A calibration signal transmitted from a RF transmit chain #0 is frequency converted corresponding to an operating frequency of a receiver, and the frequency converted signal is received in a RF receive chain #0 through a coupler & switch.

A calibration signal which is frequency converted and radiated in the RF transmit chain #0 is received in a coupling form through a RF receive chain #1 to a RF receive chain #3. This calibration signal transmitting/receiving operation is performed 4(N+1=4) times, the calibration signal transmitting/receiving operation separates a signal by toggling a phase shifter of each of the RF receive chain #0, and the RF receive chain #1 to the RF receive chain #3 corresponding to a DFT weight whenever transmitting/receiving a calibration signal. So, a finally acquired signal may be expressed as Equation (12).

$$y_{rc} = F_{N+1}^T \text{diag}\{\alpha_c, \alpha_1, \alpha_2, \ldots, \alpha_N\} s \quad \text{Equation (12)}$$

In Equation (12), $\alpha_i = T_c \exp(j\Delta_c) Q R_i \exp(j\theta_i)$ for i=c, 1, ..., N, $R_i \exp(j\theta_i)$ denotes a undesired complex gain which is resulted in by the ith receiver, $T_c \exp(j\Delta_c)$ denotes a undesired complex gain which is resulted in by the RF transmit chain #0, Q denotes a undesired complex gain which is resulted in by a frequency converter, $F_{N+1} = [f_1\ f_2\ \ldots\ f_N]$ denotes a DFT matrix, and s denotes a signal which is previously known.

The signal in Equation (12) is used for acquiring $\alpha_i$ for i=c,1, ..., N after a simple equation deployment, a receive calibration factor $F_i$ for i=1, ..., N may be acquired from this, and may be expressed as Equation (13).

$$F_i = \frac{T_c \exp(j\Delta_c) Q R_i \exp(j\theta_i)}{T_c \exp(j\Delta_c) Q R_c \exp(j\theta_c)} = \frac{R_i \exp(j\theta_i)}{R_c \exp(j\theta_c)} \quad \text{Equation (13)}$$

for $i = 1, \ldots, N$

As illustrated in FIG. 4, for a transmit calibration factor, if a signal separation for a normal antenna is unnecessary, a signal in Equation (14) may be acquired by transmitting/receiving a calibration signal one time.

$$y_{tc} = \text{diag}\{\beta_c, \beta_1, \beta_2, \ldots, \beta_N\} s \quad \text{Equation (14)}$$

In Equation (14), $\beta_i = T_i \exp(j\Delta_i) Q R_c \exp(j\theta_c)$ for i=c, 1, ..., N, $T_i \exp(j\Delta_i)$ denotes a undesired complex gain which is resulted in by the ith transmitter, $R_c\exp(j\theta_c)$ denotes a undesired complex gain which is resulted in by the RF receive chain #0, Q denotes a undesired complex gain which is resulted in by a frequency converter, and s denotes a signal which is previously known.

If the known signal s is erased from Equation (14), the transmit calibration factor may be acquired as Equation (15).

$$H_i = \frac{T_i\exp(j\Delta_i)QR_c\exp(j\theta_c)}{T_c\exp(j\Delta_c)QR_c\exp(j\theta_c)} = \frac{T_i\exp(j\Delta_i)}{T_c\exp(j\Delta_c)} \quad \text{Equation (15)}$$

for $i = 1, \ldots, N$

For a receive calibration factor, if a signal separation for a normal antenna is unnecessary, a signal in Equation (16) may be acquired by transmitting/receiving a calibration signal one time.

$$y_{rc} = \text{diag}\{\alpha_c, \alpha_1, \alpha_2, \ldots, \alpha_N\}s \quad \text{Equation (16)}$$

In Equation (16), $\alpha_i = T_c\exp(j\Delta_c)QR_i\exp(j\theta_i)$ for i=c, 1, . . . , N, $R_i\exp(j\theta_i)$ denotes a undesired complex gain which is resulted in by the ith receiver, $T_c\exp(j\Delta_c)$ denotes a undesired complex gain which is resulted in by a RF transmit chain #0, Q denotes a undesired complex gain which is resulted in by a frequency converter, and s denotes a signal which is previously known.

If the known signal s is erased from Equation (16), the receive calibration factor may be acquired as Equation (17).

$$F_i = \frac{T_c\exp(j\Delta_c)QR_i\exp(j\theta_i)}{T_c\exp(j\Delta_c)QR_c\exp(j\theta_c)} = \frac{R_i\exp(j\theta_i)}{R_c\exp(j\theta_c)} \quad \text{Equation (17)}$$

for $i = 1, \ldots, N$

An embodiment of the present disclosure proposes to perform a calibration operation in a multi-mode communication operation in order to simultaneously perform data communication and an on-line calibration operation without impacting on the data communication.

Prior to a description of operating a calibration operation in a multi-mode communication operation, it will be assumed that a cell coverage is reduced, or a plurality of BSs are used within one cell, or the plurality of BSs support one MS in order to deal with data traffic which increases in a next generation communication system which uses a beam in a high frequency band. Under this assumption, impact on interference among a plurality of BSs or interference among BSs and an MS certainly increases, so it will be assumed that control of this impact is essential for increasing a data rate.

A key purpose of operating a multi-mode communication operation is to achieve an on-line calibration for interference control and array antenna maintenance.

As described in FIG. 6, a frame structure in a communication according to an embodiment of the present disclosure includes a cell service interval and a BS communication interval, and the BS communication interval is an interval during which a plurality of BSs transmit/receive information such as synchronization information and channel information among the plurality of BSs, information on whether to perform a calibration operation, and the like one another in order to support an inter-BS cooperative communication.

In the BS communication interval, BS state information indicating whether there can be a need for performing a calibration operation for an effective calibration operation among the plurality of BSs is transmitted/received. For example, the BS generates a signal which is for BS synchronization as one of information indicating there can be the need for performing the calibration operation or information indicating there is no need for performing the calibration operation according to a situation, acquires BS synchronization by exchanging the generated information with the plurality of the BSs, checks a signal which is received from the plurality of the BSs, and may share information on whether there can be a need for performing a calibration operation for other BS with the plurality of the BSs. This signal exchange is performed among all BSs which are grouped for a cooperative communication, so each of the plurality of the BSs knows which BS among BSs included in a group in which each of the plurality of the BSs performs a cooperative communication may need a calibration operation.

As a result, BSs are scheduled and are allocated guard intervals which are not overlapped in a time domain for a calibration operation, so the BSs may sequentially perform the calibration operation. This is why all other signals may be interference for a calibration operation if a BS which performs the calibration operation does not use a frequency division scheme or a code division scheme, or add an additional device with a specific structure. For example, if two BS simultaneously perform a calibration operation, signals which are radiated which the two BSs perform the calibration operation become interference each other, so this interference may decrease a calibration performance of each BS.

A calibration operation can be performed in a calibration mode, and a detailed description will be described with reference to FIG. 8.

Figure 8:
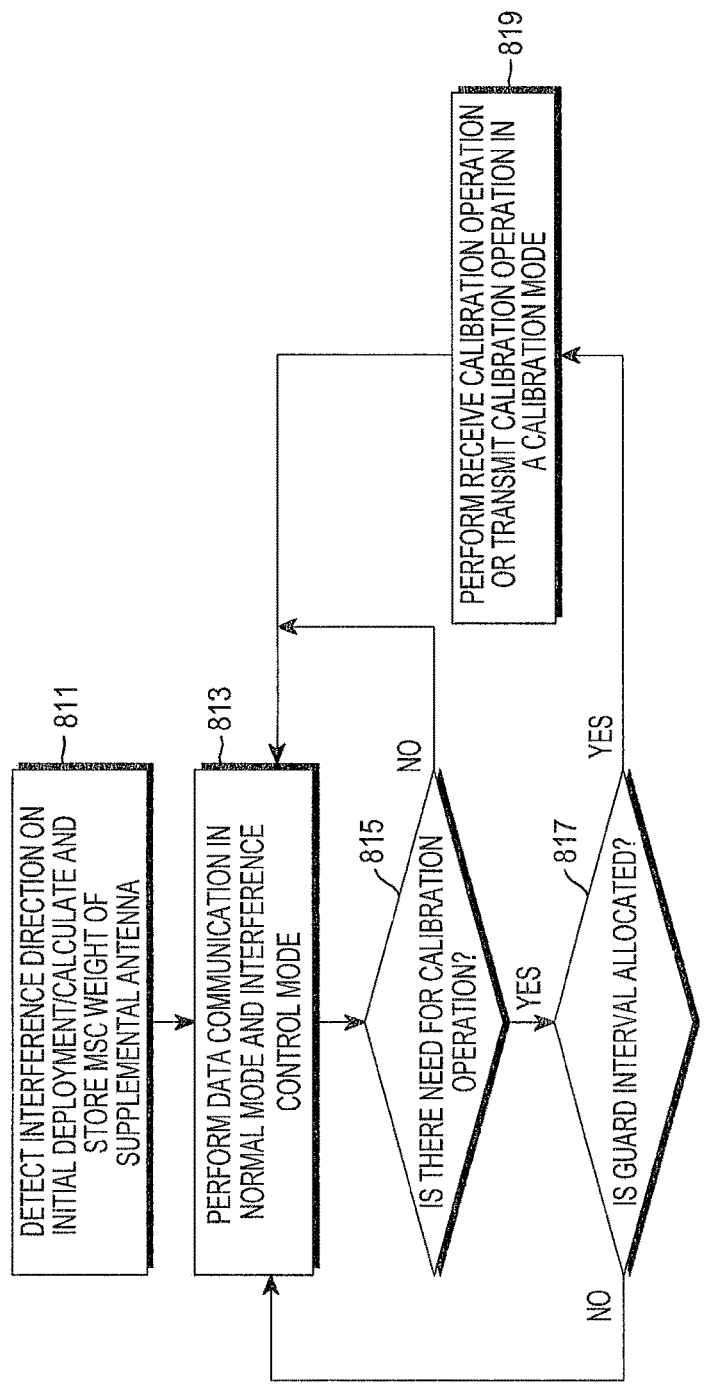
FIG. 8 schematically illustrates a process of operating a multi-mode in a BS in a communication system according to an embodiment of the present disclosure.

FIG. 8 schematically illustrates a process of operating a multi-mode in a BS in a communication system according to an embodiment of the present disclosure.

Referring to FIG. 8, a BS may detect an interference direction among BSs and cooperate with the BSs on an initial deployment, so it will be assumed that the BS know a multiple side lobe canceller (MSC) weight of a reference antenna for controlling interference among the BSs at operation 811. If there is no interference among the BSs, or there is no need for controlling the interference among the BSs, directional beam forming that there is no interference control is operated as a normal mode which is used for data communication. However, if there is the interference among the BSs, a basic operation mode of a data communication is an interference control mode for controlling the interference among the BSs.

The BS performs a data communication in a normal mode and an interference control mode at operation 813. The BS determines whether to perform an interference control operation between an MS and a BS based on channel information between the MS and the BS which is acquired in a cell service interval of a frame structure, and performs the interference control operation between the MS and the BS or does not perform the interference control operation between the MS and the BS corresponding to the determining result at operation 813. Here, the operation of determining whether to perform the interference control operation between the MS and the BS may be performed based on a channel state between the MS and the BS which may be acquired based on the channel information between the MS and the BS, e.g., a signal to interference and noise ratio (SINR). That is, if the SINR is less than a threshold SINR, the BS performs a data communication in the interference control mode after updating an MSC weight using the channel information between the MS and the BS.

The BS can measure a beam forming performance by performing a monitoring operation in a BS communication interval while performing the data communication, and exchanges information on whether to perform a calibration operation among BSs based on the measured beam forming performance at operation 813. The BS determines whether there can be a need for the calibration operation among the BSs based on the information on whether to perform the calibration operation which is monitored in the BS communication interval at operation 815.

If there is the need for the calibration operation among the BSs, the BS determines whether a guard interval is allocated to the BS for performing the calibration operation among the BSs at operation 817. If the guard interval is allocated to the BS, the BS transits to a calibration mode, performs a receive calibration operation or a transmit calibration operation at operation 819, and returns to operation 813. Here, the BS may perform the calibration operation among the BSs in the guard interval since the guard interval is allocated to the BS.

The following parameters, i.e., m1, m2, and m3 may be used as a usable metric if the BS measures the beam forming performance through a monitoring in the BS communication interval at operation 813, and a detailed description will be followed.

Firstly, the parameter m1 will be described below.

The parameter m1 denotes deference 1 between a monitored beam pattern and a desired beam pattern, and may be expressed as Equation (18).

$$m1 = \Sigma_\theta \|x_d(\theta) - x(\theta)\|^2 \qquad \text{Equation (18)}$$

In Equation (18), $\theta$ denotes an angle of departure (AOD) or an angle of arrival (AOA), $x_d(\theta)$ denotes a desired beam pattern, and $x(\theta)$ denotes a currently monitored beam pattern.

If a value of the parameter m1 is greater than or equal to a threshold value 1, the BS determines that there can be a need for a calibration operation for BSs.

Secondly, the parameter m2 will be described below.

The parameter m2 denotes deference 2 between a monitored beam pattern and a desired beam pattern, and may be expressed as Equation (19).

$$m2 = \alpha \|x_d(\theta_0) - x(\theta_0)\|^2 + (1-\alpha) \|x_d(\theta_n) - x(\theta_n)\|^2 \qquad \text{Equation (19)}$$

In Equation (19), $\theta_0$ denotes a look direction, $\theta_n$ denotes a nulling direction, and $\alpha$ denotes a value which is in a range of 0 to 1.

If a value of the parameter m2 is greater than or equal to a threshold value 2, the BS determines that there can be a need for a calibration operation for BSs.

Thirdly, the parameter m3 will be described below.

The parameter m3 denotes an SINR. If a value of the parameter m3 is less than or equal to a preset threshold SINR, the BS determines to perform a calibration operation for BSs.

In FIG. 8, the BS determines whether to perform the calibration operation by exchanging the information on whether to perform the calibration operation in the BS communication interval, however, it will be understood by those of ordinary skill in the art that the BS may perform a calibration operation for each BS according to a preset order in a preset time period without exchanging the information on whether to perform the calibration operation in the BS communication interval.

If the BS performs the calibration operation, the BS transits to a calibration mode. In this embodiment, a frequency converter and a coupler & switch of a reference antenna included in the array antenna device are used.

Although FIG. 8 illustrates a process of operating a multi-mode in a BS in a communication system according to an embodiment of the present disclosure, various changes could be made to FIG. 8. For example, although shown as a series of operations, various operations in FIG. 8 could overlap, occur in parallel, occur in a different order, or occur multiple times.

An MSC which is for beam-nulling used in an embodiment of the present disclosure may be used as an alternative scheme of a channel state information (CSI) estimation based interference control scheme. That is, an interference control scheme among general multi-user multiple input multiple output (MU-MIMO) schemes is almost a CSI estimation based scheme, and it is difficult to implement the interference control scheme in a large array system situation that the load for CSI estimation increases. So, an interference control scheme based on MS location estimation not CSI estimation may be preferable in the large array system situation.

Here, the MSC is a example scheme among MS location estimation based interference control schemes, and appropriated for an array antenna device in which a sub-array form of normal antenna and a reference antenna (supplemental antenna) are used together like an array antenna device which is based on a sub-array in FIG. 3. This will be described with reference to FIG. 9.

Figure 9:
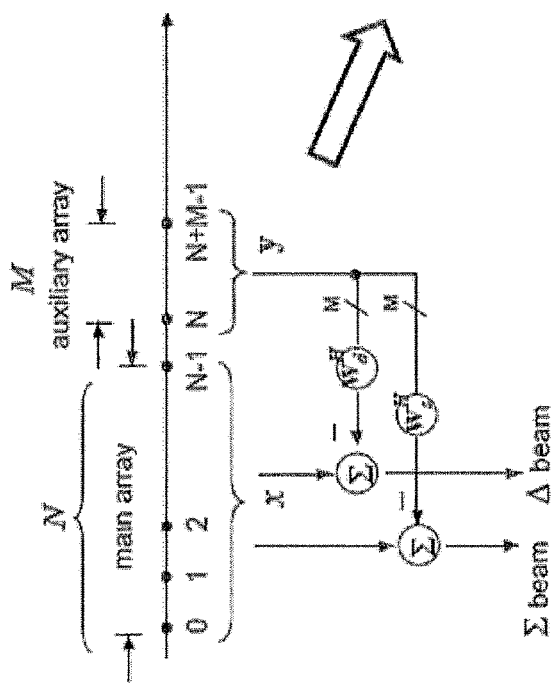
FIG. 9 schematically illustrates a principle of an MSC in a communication system according to an embodiment of the present disclosure.

FIG. 9 schematically illustrates a principle of an MSC in a communication system according to an embodiment of the present disclosure.

Referring to FIG. 9, there is a main array and an auxiliary array for an MSC. The main array is multiplied by a weight which performs a role of beam shaping through tapering or beam steering, and the weight multiplied main array is connected two channels (sum, delta).

Further, an auxiliary array is multiplied by a weight which performs a role of beam-nulling, and the weight multiplied auxiliary array is connected the two channels (sum, delta). In this embodiment, the number of optimal auxiliary antennas is equal to the number of interference directions. An MSC weight w is a weight which is used for a reference antenna, and may be expressed as FIG. 9.

Here, it will be understood by those of ordinary skill in the art that a scheme which is appropriate for a normal array form not a sub-array such as a linear constrained minimum variance (LCMV) beam former, and the like, i.e., an array antenna device in FIG. 4 may be used as well as the MSC.

An inner structure of a BS (not shown) is described below.

The BS includes the transmitter, the controller, the receiver, and the storage unit.

The controller controls the overall operation of the BS. In an embodiment, the controller controls the BS to perform an operation related to an operation of controlling an array antenna device. The operation related to the operation of controlling the array antenna device is performed in the manner described with reference to FIGS. 3 to 9 and a description thereof will be omitted herein.

The transmitter transmits various messages, and the like to an MS, and the like under a control of the controller. The various messages, and the like transmitted in the transmitter have been described in FIGS. 3 to 9 and a description thereof will be omitted herein.

The receiver receives various messages, and the like from the MS, and the like under a control of the controller. The various messages, and the like received in the receiver have been described in FIGS. 3 to 9 and a description thereof will be omitted herein.

The storage unit stores a program, various data, and the like necessary for the operation of the BS, specially, the operation related to the operation of controlling the array antenna device. The storage unit stores the various messages, and the like received in the receiver.

While the transmitter, the controller, the receiver, and the storage unit are described as separate processors, it is to be understood that this is merely for convenience of description. In other words, two or more of the transmitter, the controller, the receiver, and the storage unit may be incorporated into a single processor.

As is apparent from the foregoing description, an embodiment of the present disclosure enables to control an array antenna device thereby operating various operation modes in a communication system.

An embodiment of the present disclosure enables to control an array antenna device thereby simultaneously performing data communication and an on-line calibration operation without impacting on the data communication in a communication system.

An embodiment of the present disclosure enables to control an array antenna device thereby supporting a sub-array based structure and performing a calibration operation in a communication system.

An embodiment of the present disclosure enables to control an array antenna device thereby controlling an inter-cell interference which certainly occurs in a situation that a relatively close backhaul network which uses a high frequency band-large array-directional beam and considers a path loss ($\propto \lambda^2$) such as a femto cell, a nano cell, and the like is configured.

An embodiment of the present disclosure enables to control an array antenna device thereby decreasing CSI estimation load using an interference control scheme which is based on MS location estimation not based on CSI estimation in a large array situation.

An embodiment of the present disclosure enables to control an array antenna device thereby performing an on-line calibration operation without impacting on data communication by performing a calibration operation on each of a transmit path and a receive path in a guard interval after scheduling a calibration operation duration for BSs in a BS operating frame structure which includes a cell service interval and a BS communication interval.

Certain aspects of the present disclosure may also be embodied as computer readable code on a computer readable recording medium. A computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems such that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable read only memory (ROM), a memory, for example, a random access memory (RAM), a memory chip, a memory device, or a memory integrated circuit (IC), or an optically or magnetically recordable non-transitory machine-readable, e.g., computer-readable, storage medium, e.g., a compact disk (CD), a digital versatile disk (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an antenna array apparatus comprising a plurality of antennas in a communication system, the method comprising:
performing cooperative data communication with at least one terminal by cooperating with at least one neighbor antenna array apparatus;
determining at least one reference antenna among the plurality of antennas;
identifying a start of a first guard interval for the antenna array apparatus during the cooperative data communication, wherein the first guard interval does not overlap a second guard interval for the at least one neighbor antenna array apparatus; and
when the start of the first guard interval is identified:
pausing the cooperative data communication,
obtaining a transmit calibration factor corresponding to transmission paths between each of normal antennas of the plurality of antennas and the at least one reference antenna in the first guard interval,
obtaining a receive calibration factor corresponding to reception paths between each of the normal antennas and the at least one reference antenna in the first guard interval,
performing a calibration for a transmission path and a reception path corresponding to each of the plurality of antennas based on the obtained transmit and receive calibration factors,
identifying an end of the first guard interval while performing the calibration, and
when the end of the first guard interval is identified, resuming the paused cooperative data communication.

2. The method of claim 1, further comprises:
identifying information on the second guard interval for the at least one neighbor antenna array apparatus; and
obtaining the first guard interval for the antenna array apparatus based on the information on the second guard interval for the at least one neighbor antenna array apparatus.

3. The method of claim 1, wherein obtaining the transmit calibration factor comprising:
transmitting a calibration signal through the each of the normal antennas;
receiving the calibration signal transmitted from the each of the normal antennas through the at least one reference antenna; and
obtaining the transmit calibration factor based on the received calibration signal.

4. The method of claim 1, wherein obtaining the receive calibration factor comprising:
transmitting a calibration signal through the at least one reference antenna;
receiving the calibration signal transmitted from the at least one reference antenna through the each of the normal antennas; and
obtaining the receive calibration factor based on the received calibration signal.

5. An antenna array apparatus in a communication system, the antenna array apparatus comprising:
a plurality of antennas;
a transceiver configured to perform cooperative data communication with at least one terminal by cooperating with at least one neighbor antenna array apparatus; and
at least one processor configured to:
determine at least one reference antenna among the plurality of antennas;
identify a start of a first guard interval for the antenna array apparatus during the cooperative data communication, wherein the first guard interval does not overlap in a time domain a second guard interval for the at least one neighbor antenna array apparatus; and
when the start of the first guard interval is identified:
stop the cooperative data communication,
obtain a transmit calibration factor corresponding to transmission paths between each of normal antennas of the plurality of antennas and the at least one reference antenna in the first guard interval,
obtain a receive calibration factor corresponding to reception paths between each of the normal antennas and the at least one reference antenna in the guard first interval,
control the transceiver to perform a calibration for a transmission path and a reception path corresponding to each of the plurality of antennas based on the obtained transmit and receive calibration factors,
identify an end of the first guard interval while performing the calibration, and
when the end of the first guard interval is identified, control the transceiver to resume the paused cooperative data communication.

6. The antenna array apparatus of claim 5, wherein the at least one processor is configured to identify information on the second guard interval for the at least one neighbor antenna array apparatus, and obtain the first guard interval for the antenna array apparatus based on the information on the second guard interval for the at least one neighbor antenna array apparatus.

7. The antenna array apparatus of claim 5, wherein the at least one processor is configured to:
control the transceiver to transmit a calibration signal through the each of the normal antennas;
control the transceiver to receive the calibration signal transmitted from the each of the normal antennas through the at least one reference antenna; and
obtain the transmit calibration factor based on the received calibration signal.

8. The antenna array apparatus of claim 5, wherein the at least one processor is configured to:
control the transceiver to transmit a calibration signal through the at least one reference antenna;
control the transceiver to receive the calibration signal transmitted from the at least one reference antenna through the each of the normal antennas; and
obtain the receive calibration factor based on the received calibration signal.

9. A non-transitory computer-readable medium comprising program code for operating an antenna array apparatus comprising a plurality of antennas in a communication system, wherein the program code that, when executed by a processor, causes the processor to:
perform cooperative data communication with at least one terminal by cooperating with at least one neighbor antenna array apparatus;
determine at least one reference antenna among the plurality of antennas;
identify a start of a first guard interval for the antenna array apparatus during the cooperative data communication, wherein the first guard interval does not overlap a second guard interval for the at least one neighbor antenna array apparatus; and
when the start of the first guard interval is identified:
pause the cooperative data communication,
obtain a transmit calibration factor corresponding to transmission paths between each of normal antennas of the plurality of antennas and the at least one reference antenna in the first guard interval,
obtain a receive calibration factor corresponding to reception paths between each of the normal antennas and the at least one reference antenna in the first guard interval,
perform a calibration for a transmission path and a reception path corresponding to each of the plurality of antennas based on the obtained transmit and receive calibration factors, and
identify an end of the first guard interval while performing the calibration,
when the end of the first guard interval is identified, resume the paused cooperative data communication.

10. The non-transitory computer-readable medium of claim 9, further comprising program code that, when executed by the processor, causes the processor to:
identify information on the second guard interval for the at least one neighbor antenna array apparatus; and obtain the first guard interval for the antenna array apparatus based on the information on the second guard interval for the at least one neighbor antenna array apparatus.

11. The non-transitory computer-readable medium of claim 9, further comprising program code that, when executed by the processor, causes the processor to:
  transmit a calibration signal through the each of the normal antennas;
  receive the calibration signal transmitted from the each of the normal antennas through the at least one reference antenna; and
  obtain the transmit calibration factor based on the received calibration signal.

12. The non-transitory computer-readable medium of claim 9, further comprising program code that, when executed by the processor, causes the processor to:
  transmit a calibration signal through the at least one reference antenna;
  receive the calibration signal transmitted from the at least one reference antenna through the each of the normal antennas; and
  obtain the receive calibration factor based on the received calibration signal.

13. The non-transitory computer-readable medium of claim 11, wherein during a transmit calibration operation, the calibration signal is received through at least one first receive chain connected to the at least one reference antenna.

14. The non-transitory computer-readable medium of claim 12, wherein during a receive calibration operation, the calibration signal is received through second receive chains connected to each of remaining antennas except for the at least one reference antenna among the plurality of antennas.

15. The method of claim 3, wherein during a transmit calibration operation, the calibration signal is received through at least one first receive chain connected to the at least one reference antenna.

16. The method of claim 4, wherein during a receive calibration operation, the calibration signal is received through second receive chains connected to each of remaining antennas except for the at least one reference antenna among the plurality of antennas.

17. The antenna array apparatus of claim 7, wherein during a transmit calibration operation, the calibration signal is received through at least one first receive chain connected to the at least one reference antenna.

18. The antenna array apparatus of claim 8, wherein during a receive calibration operation, the calibration signal is received through second receive chains connected to each of remaining antennas except for the at least one reference antenna among the plurality of antennas.

* * * * *